Patented Jan. 16, 1934

1,943,815

UNITED STATES PATENT OFFICE 1,943,815

PROCESS FOR BREAKING PETROLEUM EMULSIONS

Melvin De Groote, St. Louis, Mo., assignor to Tretolite Company, Webster Groves, Mo., a corporation of Missouri No Drawing. Application January 18, 1933
Serial No. 652,419

8 Claims. (Cl. 196—4)

This invention relates to the treatment of emulsions of mineral oil and water, such as petroleum emulsions, for the purpose of separating the oil from the water, and particularly to the process described in the copending patent of Melvin De Groote and Louis T. Monson, 1,938,322, patented Dec. 5, 1933 and the process described in the copending patent of Melvin De Groote 1,938,323, patented Dec. 5, 1933.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of my invention is to provide a novel, inexpensive and efficient process for separating emulsions of the kind referred to into their component parts of oil and water or brine.

Briefly described, my process consists in subjecting a petroleum emulsion of the water-in-oil type to the action of a treating agent or demulsifying agent containing a sulfo-derivative of tetradecyl alcohol, $C_{14}H_{29}OH$, thereby causing the emulsion to break down and separate into its component parts of oil and water or brine, when the emulsion is permitted to remain in a quiescent state after such treatment.

As herein used, the term "sulfo derivative of tetradecyl alcohol" is intended to mean and include the sulfonic acids and the sulfuric acid esters of tetradecyl alcohol in the acidic or neutralized state. Such sulfo-derivatives of tetradecyl alcohol are of the type in which the sulfur atom is part of an acidic sulfur-containing group, such as a sulfuric acid ester, or a sulfonic acid. In these last two mentioned compounds, the sulfur atom is part of a group or radical, which is an acidic radical or group (which may or may not be neutralized), and thus is distinguished from other non-acidic sulfur groups or radicals, such as sulfones, sulfides, mercaptans, etc. These later types are not included by the term "sulfo-derivative of tetradecyl alcohol", as herein used. In many cases the properties of the sulfuric acid ester and of the true sulfonic acid of the alcohol in question are similar, and in describing my invention I make no distinction between the two kinds of sulfo-derivatives, although structurally there is a difference, inasmuch as the sulfur-containing group is bound to the organic residue through oxygen in the sulfuric acid ester compound, and through the sulfur atom in the true sulfonic acid. The term "sulfo-derivative of tetradecyl alcohol", as herein used, should not be interpreted or construed as being restricted to such bodies in their acidic state, for in preparing the treating agent contemplated by my process, I prefer to use sulfo-derivatives in a more or less completely neutralized state, inasmuch as such materials are strong acids and as such have a marked corrosive action on metals.

In preparing or manufacturing my improved demulsifying agent or treating agent, tetradecyl alcohol or some simple derivative thereof, such as tetradecene or a fatty acid ester of the alcohol, is subjected to the action of a sulfonating agent of a suitable strength under predetermined conditions of temperature and reaction duration. By such procedure there is produced either the sulfuric acid ester or the true sulfonic acid, or both. There may remain in the mixture some residual tetradecyl alcohol, or other parent material, which is uncombined with sulfuric acid in any form whatsoever. The presence of small amounts of such tetradecyl alcohol or other parent material does not detract from the effectiveness of the demulsifying agent produced by the above described procedure. Likewise, tetradecyl sulfonic acid may be prepared in the same manner in which cetyl sulfonic acid was originally prepared by Reychler, that is, by the conversion of the alcohol successively into the iodide, the mercaptan and the sulfonic acid, or in any other suitable manner. I prefer to produce my improved demulsifying agent by the action of 66° Baumé sulfuric acid, or fuming sulfuric acid on the free alcohol, or on tetradecene, $C_{14}H_{28}$.

Tetradecene is obtained by certain oxidation reduction reactions from mixtures of cocoanut oil and sperm oil. In these carefully regulated oxidation reduction reactions tetradecene is produced in presence of prepared catalysts and by means of suitable temperature and pressure control together with predetermined percentages of hydrogen, oxygen, and water. Such high pressure reactions produce materials containing a relatively high amount of tetradecene, and the by-products or impurities present are not objectionable.

A procedure suitable for producing the demulsifying agent contemplated by my process is as follows: tetradecyl alcohol or tetradecene is mixed with about 35% by weight of 66° sulfuric acid, and the temperature maintained at 35° C. The free tetradecyl alcohol or tetradecene is waterinsoluble and the sulfuric acid derivative is water-soluble. Tests are made to determine the extent of reaction. If the uncombined alcohol or hydrocarbon remains, the temperature is raised slightly—approximately 5 to 10° C.—or a small amount of oleum is added until there remains no substantial amount of unreacted alcohol or hydrocarbon. Of course, higher temperatures and sulfuric acid of other strengths may be employed. If tetradecene is employed, the product is almost entirely the acid sulfate without the sulfonic acid. If the alcohol is employed at a higher temperature, more sulfonic acid is obtained. When the reaction is completed the mass is then washed with water, the acidic aqueous layer is withdrawn, and the layer of tetradecyl sulfuric acid (or sulfonic acid) is neutralized with caustic soda. If all of the tetradecyl alcohol or tetradecene does not become transformed into the acid sulfate or sulfonic acid by the action of sulfuric acid, then the residual reaction mass consists of a mixture of the parent alcohol or hydrocarbon and the acid sulfate or sulfonic acid.

As previously stated, such sulfonated material or materials can be employed in the acid state to constitute the treating agent or demulsifying agent used in my process, but because of its corrosive nature, I prefer to partially or wholly neutralize said sulfonated material prior to using the same to treat the emulsion. The neutralized sulfonated material can be introduced into the emulsion in an undiluted form, or it may be dissolved in water or in oil prior to using the same to treat the emulsion.

The acidic mass may be totally or partially neutralized with any suitable base or basic material, such as ammonia, sodium hydroxide, potassium hydroxide, calcium hydroxide, magnesium hydroxide, ammonium carbonate, potassium carbon, sodium carbonate, or an aliphatic amine, which acts like ammonia, such as triethanol amine. Likewise, an ester may be produced by a suitable reaction of the acidic radical, with an alcohol, such as ethyl alcohol, or even an aromatic or cyclic alcohol. Some of the reagents thus obtained are dispersible or soluble solely in oil, and others solely in water, and some in both solvents. Accordingly, I wish to be understood that my invention contemplates the use of a treating agent or demulsifying agent that is either water-soluble, oil-soluble, or soluble in both oil and water.

The advantage or superiority of my improved demulsifying agent resides in its ability to treat certain petroleum emulsions, particularly those which contain minute particles of floating sand coated with oil particles, better than any other known demulsifying agent. I do not contend that it will supersede the majority of the modified fatty acids, sulfated fatty acids, etc., heretofore used extensively as treating agents in the resolution of petroleum emulsions. I believe that my improved treating agent above described will find comparatively limited application, so far as the majority of oil field emulsions are concerned, but I also believe that it has commercial value, because it will economically break or resolve certain oil field emulsions in a small number of cases which cannot be successfully treated at so low a cost, with the demulsifying agents heretofore employed in the resolution of petroleum emulsions.

In practising my process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of the emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsions, i. e., emulsions that will yield readily to the action of chemical demulsifying agents, the ratio of 1:30,000, above referred to, may be sufficient to produce highly satisfactory results. In general, we have found that for an average petroleum emulsion, a ratio of 1 part of treating agent to 5,000 parts of emulsion will usually be found to produce commercially satisfactory results.

Having thus described my invention, what I claim as new and desire to secure by Letters Patent is:

1. A process for breaking petroleum emulsions of the water-in-oil type, which consists in subjecting the emulsion to the action of a demulsifying agent containing a sulfo-derivative of tetradecyl alcohol, selected from the class comprising acids, salts and esters.

2. A process for breaking petroleum emulsions of the water-in-oil type, which consists in subjecting the emulsion to the action of a demulsifying agent containing a salt of the sulfuric acid ester of tetradecyl alcohol.

3. A process for breaking petroleum emulsions of the water-in-oil type, which consists in subjecting the emulsion to the action of a demulsifying agent containing the water-soluble salt of the sulfuric acid ester of tetradecyl alcohol.

4. A process for breaking petroleum emulsions of the water-in-oil type, which consists in subjecting the emulsion to the action of a demulsifying agent containing the sodium salt of the sulfuric acid ester of tetradecyl alcohol.

5. A process for breaking petroleum emulsions of the water-in-oil type, which consists in subjecting the emulsion to the action of a demulsifying agent containing a sulfonic acid derived from tetradecyl alcohol.

6. A process for breaking petroleum emulsions of the water-in-oil type, which consists in subjecting the emulsion to the action of a demulsifying agent containing the salt of a sulfonic acid derived from tetradecyl alcohol.

7. A process for breaking petroleum emulsions of the water-in-oil type, which consists in subjecting the emulsion to the action of a demulsifying agent containing the water-soluble salt of a sulfonic acid derived from tetradecyl alcohol.

8. A process for breaking petroleum emulsions of the water-in-oil type, which consists in subjecting the emulsion to the action of a demulsifying agent containing the sodium salt of a sulfonic acid derived from tetradecyl alcohol.

MELVIN DE GROOTE.